(12) United States Patent
Rust

(10) Patent No.: US 11,266,960 B2
(45) Date of Patent: Mar. 8, 2022

(54) MIXING OF EXTRUDABLE PLASTICS WITH SMALL AMOUNTS OF OTHER SUBSTANCES

(71) Applicant: Entex Rust & Mitschke GmbH, Bochum (DE)

(72) Inventor: Harald Rust, Bochum (DE)

(73) Assignee: Entex Rust & Mitschke GmbH, Bochum (DE)

(*) Notice: Subject to any disclaimer, the term of this patent is extended or adjusted under 35 U.S.C. 154(b) by 356 days.

(21) Appl. No.: 16/427,958

(22) Filed: May 31, 2019

(65) Prior Publication Data
US 2019/0366281 A1  Dec. 5, 2019

(30) Foreign Application Priority Data

Jun. 1, 2018  (DE) .................. 102018004355.0

(51) Int. Cl.
| | | |
|---|---|---|
| *B22C 5/00* | (2006.01) | |
| *B01F 7/30* | (2006.01) | |
| *C08J 3/20* | (2006.01) | |
| *B01F 15/02* | (2006.01) | |
| *B01F 15/06* | (2006.01) | |

(Continued)

(52) U.S. Cl.
CPC .............. *B01F 7/30* (2013.01); *B01F 7/008* (2013.01); *B01F 15/0035* (2013.01); *B01F 15/00155* (2013.01); *B01F 15/0235* (2013.01); *B01F 15/0283* (2013.01); *B01F 15/0289* (2013.01); *B01F 15/0292* (2013.01); *B01F 15/06* (2013.01); *B01F 15/063* (2013.01); *C08J 3/203* (2013.01); *B01F 2015/061* (2013.01); *B01F 2015/062* (2013.01); *B01F 2215/0049* (2013.01)

(58) Field of Classification Search
CPC ...... C08J 3/203; B01F 2215/0049; B29B 7/42
See application file for complete search history.

(56) References Cited

U.S. PATENT DOCUMENTS

| | | | | |
|---|---|---|---|---|
| 4,684,488 A | * | 8/1987 | Rudolph | ................. B29C 48/55 264/411 |
| 5,749,649 A | * | 5/1998 | Schobert-Csongor | ...................... B29B 7/429 366/76.4 |
| 8,293,158 B2 | | 10/2012 | Rust et al. | |

(Continued)

FOREIGN PATENT DOCUMENTS

| | | | | |
|---|---|---|---|---|
| CA | 2644372 A1 | * | 9/2007 | ........... B29C 48/395 |
| DE | 19534813 C2 | | 12/2001 | |

(Continued)

OTHER PUBLICATIONS

Google translation of description of DE 02008058048A1 (Year: 2010).*

(Continued)

*Primary Examiner* — Anshu Bhatia
*Assistant Examiner* — Gregory Y Huan
(74) *Attorney, Agent, or Firm* — Smartpat PLC

(57) ABSTRACT

A main extruder and a side arm extruder are used in the extrusion of plastics with small amounts of additives or other small substances to be admixed. A minor portion of the plastic material is premixed with small quantity additive substances in a side arm extruder. The premixed material is discharged from the side arm extruder into the main extruder and there mixed with a major portion of feed material.

31 Claims, 7 Drawing Sheets

(51) Int. Cl.
  *B01F 7/00* (2006.01)
  *B01F 15/00* (2006.01)

(56) References Cited

U.S. PATENT DOCUMENTS

| | | | |
|---|---|---|---|
| 8,957,119 | B2 | 2/2015 | Rust |
| 9,193,106 | B2 | 11/2015 | Rust et al. |
| 9,926,426 | B2 | 3/2018 | Rust |
| 10,112,320 | B2 | 10/2018 | Rust |
| 10,112,336 | B2 | 10/2018 | Rust |
| 10,131,760 | B2 | 11/2018 | Rust |
| 2008/0128933 | A1* | 6/2008 | Przybylinski ............ B29B 7/728 264/31 |
| 2013/0093114 | A1* | 4/2013 | Rust ..................... B29C 48/49 264/211.23 |
| 2018/0126597 | A1 | 5/2018 | Rust |
| 2018/0126623 | A1 | 5/2018 | Rust |
| 2018/0251624 | A1 | 9/2018 | Rust |
| 2018/0281263 | A1 | 10/2018 | Rust |

FOREIGN PATENT DOCUMENTS

| | | | | |
|---|---|---|---|---|
| DE | 102008058048 | A1 * | 8/2010 | ............ C08J 3/203 |
| JP | 2001503330 | A * | 3/2001 | |
| WO | WO-9910158 | A1 * | 3/1999 | ......... B29C 45/1642 |
| WO | WO-2009040190 | A1 * | 4/2009 | ........... B29C 48/767 |
| WO | WO-2013159801 | A1 * | 10/2013 | .......... B01F 7/00525 |
| WO | WO-2017001048 | A1 * | 1/2017 | ............. B29C 48/85 |
| WO | 2018153935 | A1 | 8/2018 | |
| WO | 2018188716 | A1 | 10/2018 | |
| WO | 2018192677 | A1 | 10/2018 | |
| WO | 2019011461 | A1 | 1/2019 | |

OTHER PUBLICATIONS

Google translation of description JP2001503330A (Year: 2001).*
Google translation of description WO9910158A1 (Year: 1999).*
Google translation of description WO2009040190A1 (Year: 2009).*
Google translation of description WO2013159801A1 (Year: 2013).*
Google translation of description WO2017001048A1 (Year: 2017).*

* cited by examiner

MIXING OF EXTRUDABLE PLASTICS WITH SMALL AMOUNTS OF OTHER SUBSTANCES

TECHNICAL FIELD

The present disclosure relates to a method and system for mixing extrudable plastics with small amounts of other substances.

BACKGROUND

Extruders are often used for processing materials, in particular plastics. Those materials are processed while they are in an at least partially molten state. Alternatively, the materials can be brought into a molten state. In particular, polymers, copolymers, and elastomers are frequently processed in extruders. Other materials of all kinds can be processed in extruders. This includes solids which can be jointly processed with molten materials. Polymers, copolymers, and elastomers can be blended with other substances, which can also be gases. These other substances may be referred to as additives.

Processed materials can be, for example: Acrylonitrile butadiene acrylate (ABAK), acrylonitrile butadiene styrene (ABS), ABS with polycarbonate (ABS+PC), acrylic rubber (ACM), ethyl acrylate rubber (AEPCMS), acrylonitrile/ethylene-propylene-diene/styrene (AES), nitroso rubber (AFMU), acrylonitrile methacrylate (AMAK), acrylonitrile/chlorinated polyethylene/styrene (APE-CS), acrylonitrile/styrene/acrylic ester (ASA), aliphatic TPE-U (ATPU), urethane rubber, polyester (AU), benzyl (BC), butadiene rubber (BR), cellulose acetate (CA), cellulose acetate butyrate (CAB), cellulose acetate propionate (CAP), cresol formaldehyde (CF), hydrated cellulose, cellophane (CSH), chlorinated PE rubber (CM), carboxymethyl cellulose (CMC), cellulose nitrate, celluloid (CN), epichlorohydrin rubber (CO), cyclic olefin copolymer (COC), cellulose propionate (CPL), chloroprene rubber (CR), casein plastics (CS), casein formaldehyde (CSF), chlorosulfonated PE (CSM) rubber, cellulose triacetate (ICTA), dicyclopentadiene (DCP), ethylene acrylic acid (EAA), ethylene vinyl acetate rubber (EAM), ethylene/butyl acrylate (EBA), ethyl cellulose (EC), ethylene copolymer bitumen (ECB), epichlorohydrin rubber (ECO), ethylene chlorotrifluoroethylene (ECTFE), ethylene ethyl acrylate (EEA), polyethylene ionomers (EIM), ethylene/methacrylic acid (EMAK), exo-methylene lactone (EML), ethylidenenorbornene (EN), ethylene-acrylonitrile rubber (ENM), epoxidized natural rubber (ENR), ethylene/propylene (EP), epoxy resins/polyaddition resins (EP), ethylene/propylene/(diene)/rubbers (EP[D]M), epichlorohydrin rubber (ETER), ethylene tetrafluoroethylene (ETFE), urethane rubber, polyethers (EU), ethylene-vinyl acetate (EVA), ethylene vinyl alcohol (EVOH), TPE, ethylene-vinyl acetate+polyvinylidene chloride (EVAPVDC), tetrafluoroethylene/hexafluoropropylene (FEP), furan formaldehyde (FF), perfluororubber (FFKM), fluorine rubber (FKM), propylene/tetrafluoroethylene rubber (FPM), phosphazene rubber with fluoroalkyl or fluoroalkyl groups (FZ), propylene oxide rubber (GPO), halogenated butyl rubber (HIIR), hydrogenated nitrile butadiene rubber (HNBR), higher alpha-olefins (HOA), polycyclones (HT-P), polyphenylene (HT-PP), polytriazines (HT-PT), butyl rubber (CIIR, BIIR, IIR), isoprene rubber (IR), hydrocarbon resin (KWH), liquid-crystalline polymers (LCP), methacrylate/acrylonitrile/butadiene/styrene (MABS), methacrylate/butadiene/styrene (MBS), methylcellulose (MC), melamine/formaldehyde (MF), melamine formaldehyde+unsaturated polyester (MF+UP), melamine phenol-formaldehyde (MPF), methyl/phenyl-silicone rubber (MPQ), methyl methacrylate/exo-methylene lactone (MMAEML), melamine phenol-formaldehyde (MPF), methyl silicone rubbers (MQ), alpha-methylstyrene (MS), melamine urea formaldehyde (MUF), melamine urea phenol formaldehyde (MUPF), fluorosilicone rubber (MVFQ), polyacrylonitrile (PAN), polybutene-1 (PB), poly butyl acrylate (PBA), polybenzimidazole (PBI), polybismaleimide (PBMI), polybutylene naphthalate (PBN), polyoxada benzimidazole (PBO), polybutylene terephthalate (PBT), polycarbonate (PC) with one of ABS, AES, ASA, PBT, PE-HD, PET, PMMA+PS, PPE, PPE+SB, PS+HI, SMA, TPU, BPA, TMBPA, or TMC; poly-3.3-bis-chloromethyl propylene oxide (PCPO), polycyclohexylenedimethylene terephthalate (PCT), polychlorotrifluoroethylene (PCTFE), polydiallyl phthalate (PDAP), polydicyclopentadiene (PDCPD), polyethylene (PE), polyesteramide (PEA), polyester carbonate (PEC), polyetherketone (PEK), polyethylene naphthalate (PEN), polyethylene oxide (PEOX), polyethersulfone (PES), polyester imide (PESI), polyethylene terephthalate (PET), possibly with an elastomer, MBS, PBT, PMMA, PSU; phenol formaldehyde (PF), phenol formaldehyde+epoxide (PF+EP), perfluoroalkoxy polymer (PFA), phenol formaldehyde melamine (PFMF), polyperfluorotrimethyltriazine rubber (PFMT), PTFE copolymer (PFTEAF), polyhydroxyalkanoates (PHA), polyhydroxybenzoate (PHBA), polyimide (PI), polyisobutylene (PIB), polyimide sulfone (PISO), aliphatic polyketone (PK), polylactide (PLA), poly(methyl acrylate) (PMA), polymethacrylimide (PMI), poly(methyl methacrylate) (PMMA), poly (acrylic ester) imide (PMMI), polymethylpentene (PMP), poly-alpha-methylstyrene (PMS), fluoro/phosphazene rubber (PNF), polynorbornene rubber (PNR), polyolefins, polyolefin derivatives and polyolefin copolymers (PO), poly-p-hydroxy benzoate (POB), polyoxymethylene (POM), POM with PUR elastomer or homopolymer or copolymer, polypropylene (PP), chlorinated polypropylene or polyphthalate carbonate, polyamide (PPA), polyphenylene ether (PPE), PPE with PA, PBT or PS, Polydphenyloxide pyrronellithimide U (PPI), polyparamethylstyrene (PPMS), polyphenylene oxide (PPO), polypropylene oxide (PPDX), poly-p-phenylene (PPP), polyphenylene sulfide (PPS), polyphenylene sulfone (PPSU), poly-m-phenylene/terephthalamide (PPTA), polyphenylvinyl (PPV), polypyrrole (PPY), polystyrene (PS), PS with PC or PE or PPE, polysaccharides (PSAC), polysulfone (PSU), polytetrafluoroethylene (PTFE), polytetrahydrofuran (PTHF), polybutyrene terephthalate (PTMT), Polyester (PTP), polytrimethylterephthalate (PTT), polyurethane (PUR), polyvinylacetate (PVAC), polyvinylalcohol (PVAL), polyvinylbutyral (PVB), polyvinylisobutylether (PVBE), polyvinylchloride (PVC). polyvinylidene chloride (PVDC), polyvinylidene fluoride (PVDF), polyvinyl fluoride (PVF), polyvinylformal (PVFM), polyvinylcarbazole (PVK), polyvinylmethylether (PVME), polyvinylcyclohexane (PVZH), phosphazene rubber with phenolic groups (PZ), resorcinol formaldehyde (RF), styrene acrylonitrile (SAN), styrene butadiene (SB), styrene/butadiene/methyl methacrylate (SBMMA), styrene/butadiene rubber (SBR), styrene/butadiene/styrene (SBS), styrene-ethenebutene/styrene (SEBS), Styrene/ethylene/propylene/diene rubber (SEPDM), silicone (SI), styrene/isoprene/maleic anhydride (SIMA), isoprene/styrene rubber (SIR), styrene-isoprene-styrene (SIS), styrene-maleic anhydride (SAM), styrene maleic anhydride/butadiene (SMAB), styrene/methyl methacrylate (SMMA), styrene-alpha-methylstyrene (SMS, polyester (SP), thiocarbonyl difluoride copolymer rubber (TCF), TPE with EPDM+PP or PBBS+

PP, TPE with PEBBS+PPE or PEBS+PP or with PESST or PESTRUR or with PESTEST or with PESTUR or with PEUR or with SBS+PP, thermoplastic elastomers (TPE), thermoplastic starch (TPS), urea-formaldehyde (UF), vinyl chloride (VC), vinyl chloride-ethylene (VCE), vinyl chloride-maleic anhydride (VCMA), and vinyl ester (VE).

Processing materials in an extruder, in particular blending of two or more substances, can be used to alter or intensify material properties or create new material properties. This includes, for example, increasing a material's heat resistance or wear resistance, or increasing the material's acid resistance or UV stability. It can include reducing a material's degradation under the influence of one or more environmental factors such as heat, light or chemicals such as acids, alkalis and some salts. It can include increasing or reducing the materials resilience/elasticity. Processing may cause a crosslinking of molecules or a chemical reaction of the polymers. It may cause a discoloration of the polymers or increase the color consistency of polymers. It may alter the melting point or facilitate the dispersion and homogenization. Processing may cause or facilitate foam generation. Processing may facilitate a material's extrusion or alter the material's friction coefficient. Processing may improve a material's fire/flame resistance or change its electric conductivity. Substances processed in an extruder may include materials that support further processing or machining of a material. Substances processed in an extruder may also be fillers.

It is common to feed extruders with a compounded material which already contains a desired mixture of a raw material and predetermined amounts of other substances. These other substances may be referred to as additives. Usually, the compounded material is manufactured and delivered by suppliers. It is stored and fed into the extruder like any other feed material.

The compounded material is typically available in practically any desired grain size. Use of a compounded feed material simplifies the entire extrusion process. However, the use of a compounded feed material also eliminates the possibility to make short-term changes in the composition of the compounded material, i.e. in the quantity of additive material contained in the compounded feed material. A change in the composition of the compounded feed material must be made by the supplier of the compounded feed material.

Generally, use of a compounded feed material simplifies processing, but is more expensive than the material cost of the different ingredients contained within the compounded material. Preparing a mixture of different substances directly in an extruder offers cost advantages over the use of a compounded feed material that already contains the same substances. Also, preparing a mixture directly in an extruder allows quick changes and adjustments in the composition of materials. This allows operators of an extruder to make process changes in-house which provides advantages in terms of quality and in terms of costs of the final product.

However, there are additives that are very difficult to blend into a mixture. This is especially true for small blending quantities, which are to be distributed homogeneously within large quantities of material. Small amounts are amounts of less than 4 wt %, less than 3 wt %, possibly less than 2 wt %, or even less than 1 wt %. The percentages by weight relate to the entire material processed in the main extruder. Materials used in such small quantities include, for example, colors and nucleating agents.

Processing challenges can also arise if two feed materials mix poorly with each other even in relatively large proportions. Feed materials that are challenging to process include those that are dust-like or have even finer grain, for example fillers such as chalk.

An object of the present disclosure is to overcome these challenges and present a solution that allows mixing of different feed materials directly at an extrusion line, including additives that are used only in small quantities.

SUMMARY

This is achieved with the features of the invention as claimed. The dependent claims describe preferred embodiments of the invention.

A method and a system for mixing extrudable plastics with small amounts of other substances is based on mixing a mass of plastic with one or more other materials in a main extruder. The one or more other materials may be difficult to directly mix with the plastic. Therefore, a premix is produced in a side arm extruder. The premix combines a minor amount of plastic and the additive materials to be mixed. This side arm extruder may be a single-screw extruder, a twin-screw extruder, or a planetary roller extruder. The side arm extruder may be in fluid communication with the main extruder through a nozzle. In a side arm extruder constructed as a single-screw extruder, the nozzle is usually aligned with the screw of the side arm extruder. In a side arm extruder designed as a twin-screw extruder, the nozzle is usually arranged centrally at the end of the housing cavity between the two screws. In a side arm extruder designed as a planetary roller extruder, the nozzle usually aligns with the central spindle.

The plastic mass used for premixing may be removed from the main extruder and fed back into the main extruder after being mixed with the challenging additive components. The diverted amount of plastic is preferably in the plasticized state. That is, it is fed to the side arm extruder as a melt. Alternatively, the plastic mass may be supplied to the side arm extruder in solid form and melted in the side arm extruder. The mixing with the challenging additive mixture materials takes place in a favorable ratio for the mixture. Subsequently, the resulting mixture is discharged as needed from the side arm extruder in the main extruder.

The side arm extruder requires only a fraction of the power of the main extruder to produce the premixture. Generally, this fraction corresponds to the ratio of feed material and additive material processed in the side arm extruder relative to the total feed material and additive material processed in the main extruder.

The ratio of amounts of feed material and additive material processed in the side arm extruder to the total amount material processed in the main extruder is typically different than the ratio between plastic and other materials processed in the side arm extruder.

It is advantageous, if the plastic in the side arm extruder is plasticized separately from the other substances to be blended. The amount of plastic processed in the side arm extruder is referred to as the minor portion. The amount of plastic fed into the main extruder is referred to as the major portion. The amount of plastic processed in the side arm extruder (minor portion) is preferably at least 40 wt % of the total amount of material (plastic and other substances) processed in the side arm extruder. More preferably, the minor portion is at least 30 wt %, and most preferably at least 20 wt % of the total material processed in the side arm extruder. The amount of plastic processed in the side arm extruder may also be at least 10% by weight of the total amount of material processed in the side arm extruder.

The side arm extruder may be provided on a side of the main extruder. However, the side arm extruder may also be mounted under or above the main extruder. The term "side arm" is not meant to imply any particular orientation of the side arm extruder but rather refers to its function. The side arm extruder may be arranged inclined relative to the main extruder.

It is advantageous for the premixing of plastic and other substances if the side arm extruder includes a closure. By selective opening and closing the closure it possible to safely adjust the amount of melt that is discharged from the side arm extruder into the main extruder based on demand. The side arm extruder should be sized to provide sufficient premixed material based on the requirement of the main extruder.

The closure may be provided in form of a closable nozzle. The closure may alternatively or additionally be provided in form of a side arm extruder whose screw/spindle is adjustable in the axial direction. The adjustable screw/spindle may form the closure for the nozzle or form an adjusting member for a closure/plug of the nozzle, from which melt is discharged into the main extruder. By moving the screw/plug, the nozzle can be fully or partially opened or completely or partially closed. Optionally, a nozzle which can be moved in the axial direction in relation to a closure/plug can also be provided.

Optionally, the screw/spindle forms a tip, which projects into the nozzle opening at least in the closed position. With a screw/spindle protruding into the nozzle, the nozzle opening or the tip of the screw/spindle has a shape which tapers in the flow direction of the melt. The tip of the screw/spindle may have a wedge shape and the nozzle may be adapted to that shape.

Preferably, the nozzle opening and the tip of the screw/spindle have a conical shape. The tip of the screw/spindle can also have a spherical shape or another round shape, in particular be ball-shaped. A tapered nozzle as well as a nozzle with a cylindrical opening can be combined with such a tip.

The opening of the nozzle, which tapers in the direction of melt flow, can correspond to the tip of a screw/spindle which tapers the same way as the nozzle opening. The tip can move with an axial movement of the screw/spindle into the nozzle. Thereby, the nozzle is partially or completely closed. In opposite direction, the tip moves with an axial movement of the screw/spindle out of the nozzle and partially or completely opens the nozzle.

Depending on its diameter, the tip of the screw/spindle may in the closed position protrude beyond the nozzle tip. This is the case when the tip of the screw/spindle has a smaller diameter than the opening at the downstream end of the nozzle. Downstream here refers to the flow direction of the melt.

Alternatively, the tip of the screw/spindle may in the closed position be flush with the downstream end of the nozzle (the nozzle tip). This is the case when the tip of the screw/spindle has the same diameter as the opening at the downstream end of the nozzle.

In yet another configuration the tip of the screw/spindle may in the closed position only partially protrude into the nozzle. This is the case when the tip of the screw/spindle is wider in diameter than the nozzle opening at the downstream end of the nozzle.

In one embodiment the lateral surface of the tip of the screw/spindle may extend parallel to the lateral surface of the nozzle opening.

In other embodiments, a tip of the screw/spindle is provided which tapers differently than the nozzle opening. In this case, a wedge-shaped or conical-shaped tip of the screw/spindle may have a smaller inclination or a greater inclination than the nozzle opening.

If the tip of the screw/spindle has a smaller inclination than the nozzle opening then, depending on the diameter of the tip of the screw/spindle, an edge of the tip of the screw/spindle may touch the lateral surface of the nozzle opening or an edge of the nozzle opening may touch the lateral surface of the tip of the screw/spindle.

In yet another embodiment the tip of the screw/spindle has a spherical shape or otherwise round shape. The nozzle opening is conical in shape. The, depending on the diameter of the tip of the screw/spindle, the tip of the screw/spindle may contact the lateral surface of the nozzle opening or the edge of the nozzle opening may contact the lateral surface of the tip of the screw/spindle.

The movement of the screw/spindle may be realized in that the screw/spindle is arranged axially displaceable in the associated extruder housing.

Instead of or in addition to the axial movement of the screw/spindle, a movement of the nozzle may be provided.

Instead of a displaceable screw/spindle, a valve can be used at the nozzle. The valve may be a rotary valve or a gate valve. The gate valve may utilize an axially adjustable gate.

For the opening movement and/or the closing movement different drives are can be used. Those may be hydraulic drives or mechanical drives. Hydraulic drives use a hydraulic cylinder/force piston which acts in the axial direction on the screw/spindle with a travel control/step control. With electronic distance measurement, even small movement/adjustments can be measured and controlled. Electrical lifting devices can also are used as a drive for the axial movement of the screw/spindle.

A motor and a gear are provided at an end of the screw/spindle which faces away from the nozzle. The motor and gear effect rotation of the screw/spindle in the side arm extruder. The ability of the screw/spindle to rotate is not impeded by the axial displaceable arrangement of the screw/spindle. For this purpose, for example, a drive wheel with a splined connection may be provided on the screw/spindle. The splined connection allows displacement of the screw/spindle in the axial direction with a necessary clearance for a rotary drive wheel.

A belt drive with one or more V-belts can form an inexpensive drive connection between the screw/spindle and the drive. The V-belt allows a fixed arrangement of the drive wheel on the axially displaceable screw/spindle.

The side arm extruder is preferably a single-screw extruder or a twin-screw extruder, but even more preferably a planetary roller extruder. These extruder types have a feeder, into which the desired plastic is filled. At the same time, the other substances to be mixed with the plastic can be, partly or completely, introduced into the side arm extruder. The other substances to be mixed with the plastic are optionally introduced partially or completely only after the plastic in the side arm extruder has melted.

Downstream of the feeder is an extruder section in which the plastic is melted, homogenized and brought to and maintained at the temperature required for discharge into the main extruder. If necessary, degassing can also take place. The melting of the plastic takes place by appropriate heating. The deformation work in the extruder leads to an energy input into the feed material mixture in the extruder. This introduced energy converts into mechanical heat.

Dedicated heating of the side arm extruder may be provided. The heating may use a temperature control mechanism. As part of this temperature control mechanism the housing of the side arm extruder may include channels for a heat transfer fluid. The heat transfer fluid may be water or oil. For heating, heated heat transfer fluid is introduced into the housing. There, the heat transfer fluid releases its heat partly into the plastic.

After reaching the melting temperature, the further deformation of the plastic leads to further heating, if not counteracted by cooling. In this situation the heat transfer fluid serves for cooling. Excess heat is absorbed when a cold heat transfer fluid is passed into the channels of the housing.

Separate heat transfer fluid circuits may be used for heating and cooling. This allows faster switching from heating to cooling the extruder.

It is conceivable to switch over in the lines for the heat transfer fluid, so that for heating a heated heat transfer fluid is directed into the planetary roller extruder modules and for cooling abruptly cooled heat transfer fluid is directed into the planetary roller extruder modules.

The right time to switch from heating to cooling can be determined based on experience or on a heat calculation. The time corresponds to a certain point on the processing line of the extruder. After determining this point, a modular extruder having several separate sections can be configured such that two adjacent modules/sections are connected to each other approximately at the point at which the switching from heating to cooling should take place. A modular/sectional structure of an extruder is typically limited to the housing or the planetary spindles. The screw/central spindle extends from the drive through all modules/sections to the nozzle. In other words, the distance of this heating/cooling switchover point from a joint of two housing components preferably does not exceed 50 mm, is preferably not more than 40 mm, more preferably not more than 30 mm and most preferably not more than 20 mm. In such a configuration the immediate switch from heating to cooling can be accomplished by an extruder module/section with heating followed by a downstream extruder module/section with cooling.

The addition of substances other than plastics in the side arm extruder after melting the plastics can be accomplished with conventional gravimetric dosing. The substances fall due to their weight into the entry opening of the side arm extruder. It is also possible to use a different type of feeding, for example a forced feed, which is independent of the weight and/or the particle size of the other substances. These include, in particular, insertion systems which are designed in the manner of a single-screw extruder or twin-screw extruder.

Optionally, plastic can be fed in molten form rather than in solid form into the side arm extruder. The other substances intended for premixing with the plastic melt can be fed into the side arm extruder simultaneously with the melt.

After melting the plastic and before mixing in the other substances, optionally also after mixing in the other substances, a degassing can take place. For degassing, a separate extruder module/section is advantageous. Hereinafter, this module/section is referred to as a degassing module. The degassing module has a lateral opening through which gas can escape. Preferably, an empty running further side arm extruder is connected to this lateral opening of the degassing module. Running empty refers to the extruder being operated as if extrusion material was to be conveyed into the main extruder. However, this operation of the degassing extruder takes place without extrusion material. The degassing extruder pushes extrusion material that has escaped back into the main extruder. Extrusion material may escape, together with gas, through the lateral degassing vent due to pressure in the main extruder. The degassing extruder allows only free gas to escape.

Even more preferably, the degassing extruder is a twin-screw extruder which is particularly suitable for preventing the feed material, including melt, from escaping through the lateral opening of the degassing module. The preferred type of side arm extruder intended for degassing is a twin-screw extruder and the preferred type of side arm extruder intended for introducing feed material is a planetary roller extruder.

A simultaneously applied suction at the degassing side arm extruder pulls gas due to intentional leakage from the degassing module of the main extruder. For leakage, the necessary clearance between the screws of the degassing side arm extruder and the surrounding housing may be sufficient. The use of the movement clearance has the advantage that the gap formed by the movement between the screws and the surrounding housing is always kept open by the screw movement.

Optionally, an additional clearance between the screws of the degassing extruder and the surrounding housing is generated. This can be done by machining the screws on their outer circumference. Optionally, the gas passage can also be promoted by recesses on the screws or in the screws.

The correct measure of the leakage can be found by conducting experiments. Beginning with a usual movement clearance between screws and surrounding housing, material is removed from the outer circumference of the screws, so that in steps of at least $1/10$ mm, their diameter is reduced. After each diameter reduction a test may be performed to check whether the clearance is now sufficient for degassing. If it is apparent in a first test that the gas permeability in the extruder for degassing is much too low, the first step can also take place with a diameter reduction of $3/10$ mm or more.

Accordingly, it is possible to proceed if instead of or in addition to increasing the clearance of movement of the screws in the surrounding housing, recesses are provided in the screws. The recesses may have any shapes and be manufactured in any way. Advantageous are drilled holes. For drilling there are many tools including drill bits and drilling machines. Holes with a small diameter are preferred. The more holes are drilled, the more accurately tests can find the right number of holes.

The degassing side arm extruder can be arranged laterally or below the degassing module or arranged at an incline on the degassing module. The degassing side arm extruder is preferably arranged vertically above the main extruder. Then the weight of the melt that escaped from the degassing module into the degassing side arm extruder supports its transport back in the direction of the main extruder.

As far as the plastic is fed in form of granules into the side arm extruder, the quality of the mixture may depend on the nature of the other mixture components. When mixing granules with different grain sizes, large grains tend to segregate. If the nature of the mixture components shows difficulties when mixed with the plastic granules, the mixture components can be joined together to form larger particle sizes if the initial particle size is too small, for example by compacting. Mixing components having particle size too large can be reduced to the appropriate smaller particle size, for example by grinding. With the right particle size advantageous conditions for the dispersion of the additive in the plastic can be created.

The side arm extruder for the direct feed of feed material into the main extruder can have different designs. These include both single-screw extruders and twin-screw extruders as well as planetary roller extruders.

As a single-screw extruder, the side arm extruder optionally has a screw with a reduced conveying effect. Typically, a single screw has a high delivery force, resulting in significant pressures that makes it difficult to accommodate a reduced need for molten plastic. By reducing the conveying effect pressures are reduced, which facilitate the adaptation to a reduced demand.

The conveying effect is preferably reduced by incorporating one or more openings in the screw. The incorporation can be achieved by milling. By milling, the original screw threads are interrupted (cut back) at intervals. Openings/gaps are so formed through which material can escape and even flow back. The gaps may be arranged on a parallel to the central axis of the associated screw. The openings/gaps are preferably at the edge of the associated screw. In addition, the openings/gaps may be arranged on a line of an imaginary flight which has a different pitch with respect to the screw axis. Preferably, this line has an opposite slope with respect to the existing flights. Through the openings/gaps a desired leakage flow is created.

The larger the openings/gaps, the better the plasticized plastic can flow back in the extruder. This happens until the melt is again caught by the screw and pushed in the direction of the extruder outlet. If no melt is removed at the nozzle, then the excess melt can escape once again by way of the leakage flow. This can may be referred to as "circulating" the melt. The larger the amount of melt moved in this way, the easier it is for the amount of melt to be available for the resulting melt requirement and for the availability to be controlled. Decisive for the "circulated" amount of melt are the leakage flow and the void volume of the side arm extruder.

After opening the nozzle, melt flows into the main extruder. At the same time, however, melt also flows back through the openings/gaps of the associated screws. The conveying characteristics of the side arm extruder are selected such that the melt flowing into the main extruder has the desired amount and the desired pressure. Optionally, the speed of the side arm extruder is increased or the speed of the side arm extruder is reduced when the nozzle is closed at the transition of the side arm extruder in the main extruder. The speed difference between the operating state with the nozzle open and the nozzle closed is preferably at least 10%, preferably at least 30%, even more preferably at least 50% and most preferably at least 70%, based on the rotational speed when the nozzle is closed.

If a twin-screw extruder is used as a side arm extruder the earlier remarks relating to a side arm extruder in a single-screw type apply correspondingly. The screws of the twin-screw extruder may also be provided with openings/gaps.

The use of planetary roller extruders as side arm extruder provides several advantages. Planetary roller extruders consist essentially of a central spindle, a housing surrounding the central spindle at a distance, and planetary spindles which rotate in the cavity between the central spindle and the surrounding housing around the central spindle. Both the planetary spindles and the central spindle are provided with external teeth. The housing has an internal toothing. All gears have the same toothing module, so that the planetary spindles can mesh with their teeth with the teeth of the central spindle and the housing. At the same time, the planetary spindles slide with their rear end in the extrusion direction against a stationary sliding ring.

There are various openings between the planetary spindles, the central spindle, and the housing's internal teeth. Melt can flow through these openings against the conveying direction of the extruder after closing the outlet opening/nozzle of the side arm extruder. The extent of this flow can be influenced by several factors. Those include in particular the size of the openings, which depends on the number of planetary spindles and the cavity volume of the extruder. The flow is also influence by the design of the planetary spindles and by the speed of the central spindle.

The free volume of the side arm extruder is the interior of the side arm extruder minus the volume of the screw and other components that protrude into the side arm extruder. In the case of using a planetary roller extruder, the free volume is calculated from the volume of the internally toothed housing, minus the volume of the center spindle and the planetary spindles and minus the volume of internal components such as rings.

Preferably, the degree of filling of the feeder/pre-mixing side arm extruder is measured. This can be done by positioning a sensor in the lateral wall of the feeder section of the side arm extruder. The sensor may include any form of measurement that reacts to melt. These include, for example, pressure, temperature, ultrasound and other sounds. Feed material for melt production is added in the side arm extruder if the filling level falls below a predetermined degree of filling until the predetermined degree of filling is reached again.

A reduced conveying action can also be effected with a bypass which starts upstream of the nozzle and which returns the melt completely or partly to a suitable section of the side arm extruder. Only part of the melt is recycled when the nozzle is partially closed or only partially open. All of the melt is recycled when the nozzle is completely closed. A suitable return portion for the recycling of the bypassed melt may be the melt-producing region or a location downstream thereof. The bypass is preferably a thermally insulated (possibly also heated) pipeline. One end of this pipeline is flanged to an opening in the barrel of the side arm extruder upstream of the nozzle. The other end of this pipeline is flanged to a further opening in the barrel of the side arm extruder, which is located downstream of the melt production section.

Optionally, the pipeline of the bypass also leads first to a melt container and from there to the main extruder. It is favorable if the melt container is temperature controlled. It is also advantageous if in the melt container, a stirrer or the like is provided, with which the melt is circulated.

Planetary roller extruders are more suitable as side arm extruder than the single-screw extruders or twin-screw extruders. With a planetary roller extruder, the desired leakage flow can be produced much easier than with a single-screw extruder or twin-screw extruder. In addition, the planetary roller extruder has other important advantages over the single-screw extruder. These include a much better mixing performance and much better temperature control The planetary roller extruder also starts with a drive and ends with the nozzle. In between, the planetary roller extruder can be provided with a one-piece housing extending over the entire length. The planetary roller extruder can also be composed of several modules/sections between the drive and the nozzle. In such a configuration a common central spindle extending between the drive and nozzle through all modules may be provided.

The individual modules/sections can serve on one or more different purposes. Preferably, all modules/sections of the planetary roller extruder are designed in planetary roller extruder design. It is also possible to combine modules/sections in planetary roller extruder design with modules/ sections of a different design. This is especially true for the feeder. The modules/sections for the feeder used to be mostly designed as single-screw extruders. In that case, the central spindle extended in the module/section for the filling part as a single screw.

Planetary roller extruders are particularly suitable for generating a backflow/leakage flow and for "circulating" melt. Being able to circulate melt has the advantage that the side arm extruder used for premixing can be brought in a desired and stable operating state regardless of the main extruder. Similarly, the main extruder can be brought in a desired stable operating state independently of the side arm extruder and before melt is discharged from the side arm extruder into the main extruder. This considerably facilitates the starting up of the extrusion line.

With some practice, it is possible for operators to start up the main extruder and the side arm extruder simultaneously, although with independent operation.

The flow of melt within planetary roller extruders can be influence by several factors. One effective way to control the flow of melt is by design or making adjustments in the configuration of its planetary spindles. Foremost, the number of planetary spindles can be altered, and in particular reduced. Depending on the size of the planetary roller extruder/planetary roller extruder module/section, up to 24 or more planetary spindles can be present. For smaller sizes, 5 or 6 planetary spindles may be used. Reducing the number of planetary spindles by one already means a considerable reduction for smaller sizes. For larger sizes, a comparable reduction only occurs when several planetary spindles are removed. The smaller the number of planetary spindles becomes, the larger becomes the spacing of the spindles in the circumferential direction and the easier it is for the melt to flow back between the planetary spindles.

The reduction in the number of planetary spindles has a limit at three planetary spindles. The backflow/leakage flow can be very beneficially influenced by changing the planetary spindles and the number of planetary spindles. A single-screw extruder does not offer comparable possibilities.

During a reconfiguration, the planetary spindles are redistributed at the circumference of the central spindle to ensure even distribution after each reduction/change in the number of planetary spindles. Evenly distributed planetary spindles better support the central spindle in the housing and reduce the risk of planetary spindle slippage. Slippage usually results in immediate blockage of the extruder and tooth breakage. The uniform distribution of the planetary spindles also reduces wear A reconfiguration (reduction of the number of planetary spindles/change of the distribution of the planetary spindles) is carried out at standstill of the side arm extruder after disassembly of the nozzle. In addition, the reduction of the number of planetary spindles/change of distribution takes place module by module/in sections. Removed are not only the nozzle, but also all modules/sections downstream of the module/section to be reconfigured. However, the central spindle remains in place.

For redistribution, use of a template is recommended for inexperienced operators. The template is pushed onto the central spindle. The template has holes at those locations where the planetary spindles between the central spindle and the surrounding housing are to be inserted. The holes have a diameter equal to the planetary spindle diameter plus a generous clearance. As a result, the planetary spindles can be easily pushed through the holes into the space between the central spindle and the associated housing, while being arranged a distance from each other which is at least approximately equal. Experienced operators may not need to use a template.

The backflow/leakage flow can also be influenced with a reduced set of teeth. Modern planetary roller extruders use an involute gear. Advantageously, their teeth can be significantly changed. The unchanged toothing of planetary spindles is referred to as normal toothing. This normal toothing can be changed in various ways:

Individual teeth can be completely or partially removed from the set of teeth of a planetary spindle. The number of teeth is reduced. The number of teeth can be reduced to three teeth, or even until only a single tooth remains. This can be done by removing teeth from prefabricated planetary spindles. The removal of the teeth is preferably carried out by milling and subsequent fine machining by grinding. Alternatively, planetary spindles can also be originally manufactured with a reduced set of teeth equivalent to those of planetary spindles on which teeth have been removed after the spindle was manufactured. Preferably, the remaining teeth are evenly distributed on the circumference of the planetary spindles.

Even with just one tooth, the planetary spindles still receive sufficient guidance and support in the external toothing of the central spindle and the internal toothing of the housing. This is caused by the fact that each tooth winds around the planetary spindles helically several times over the length of the planetary spindles.

All teeth of the planetary spindles can also be reduced in height, as long as portions on the planetary spindles remain that provide sufficient guidance for the planetary spindles. Such guide portions may have a nominal toothing (unchanged toothing), which is preferably located at the ends of the planetary spindles. It is advantageous to combine such planetary spindles with completely normal toothed planetary spindles in an extruder. During their circulation around the central spindle the normal teeth push all feed material out of the tooth gaps of the central spindle and the tooth gaps of the internal teeth of the housing and so prevent feed material from aggregating and sticking in the tooth gaps. This can be referred to as cleaning the tooth gaps.

Preferably, not all teeth of the planetary spindles are reduced in height. At least one tooth retains its original height. This can provide the planetary spindles the necessary guidance/support in the external toothing of the central spindle and the internal toothing of the housing, so that guide sections are no longer needed. In addition, the teeth left at their original height on the planetary spindles also clean the tooth gaps on the central spindle and clean the tooth gaps on the internal toothing of the housing.

The reduction in height of the teeth can be done similar to the complete removal of teeth, for example by milling and subsequent fine machining. Preferably, the tooth height is reduced by at least 20%, more preferably by at least 40%, and most preferably by at least 60%.

It is also advantageous if the height-reduced/flattened teeth experience a rounding on the resulting new tip. This improves the flow of the feed material during the displacement of feed material in the corresponding tooth gaps of the central spindle and the corresponding tooth gaps of the internal toothing of the housing.

The teeth of the planetary spindles can be completely or partially interrupted (cut back) by a further toothing, which runs in the opposite direction to the normal toothing with a different inclination, in particular in opposite directions. That is, the tips of the planetary gear teeth can be interrupted at regular intervals or at irregular intervals in whole or in part. A uniform interruption arises, for example, when the planetary spindles are counter-toothed after production of the normal toothing. This leads to a nub structure of the planetary spindle surface. Therefore, we refer to such planetary spindles as nub spindles or Noppenspindel. The opposite toothing extends to the root of the tooth gaps.

If the opposing teeth are cut less deeply into the planetary spindles, this results in a different planetary spindle surface with increased conveying effect.

A uniform interruption also occurs when annular circumferential grooves are incorporated in the planetary spindles at regular intervals. Due to their appearance we refer to these planetary spindles as porcupine spindles or Igelspindel. The grooves are usually incorporated to the tooth base. The grooves can be incorporated less deeply to achieve other properties.

Likewise, the toothing can be varied by changing the multiplicity of opposing teeth. The normal toothing has a certain number of teeth, depending on the tooth module/tooth dimensions and the reference diameter of the toothing. These teeth wind parallel to each other around the planetary spindles and include the multi-threading of the planetary spindles. With the same opposite toothing arise the nubs described above. However, it is possible to cut teeth in the normal toothing at a greater distance than in the normal toothing. Then webs, not nubs, are created because the teeth of the normal teeth are interrupted at a greater distance.

The teeth can also be interrupted at intervals by annular grooves wholly or partially.

Advantageously, the described planetary spindles with modified toothing are altogether or individually or in groups interchangeable with each other and against planetary spindles with normal teeth. By substitution essential effects of the planetary spindles of choice can be increased or reduced by choice. On the planetary roller extruder serving as a side arm extruder, the interchangeability of the planetary spindles is an extreme advantage that cannot be found in a comparable form in single-screw extruders and twin-screw extruders.

Various embodiments of the planetary spindles are available for the advantageous replacement or change of the return flow/leakage flow by exchanging the planetary spindles:

Reducing the number of planetary spindles and reducing the number of teeth on the planetary spindles can occur together or individually.

The measures described above have in common that openings are formed in the planetary roller extruder through which the melt which is currently not required in the main extruder can flow back. This includes a desirable leakage flow. The backflow/leakage flow continues until the melt is once again caught by the planetary spindles and conveyed in the direction of the nozzle. If still no melt is discharged into the main extruder or only small amounts of melt are discharged into the main extruder, then the circulation of the melt not presently needed in the main extruder starts over.

When melt is discharged through the nozzle into the main extruder, new material is fed to the side arm extruder. This can be done continuously or at intervals or as needed depending on the above measurements.

A particularly advantageous form of a side arm extruder uses a vertical arrangement of the planetary roller extruder, as shown and described in DE19534813C2. The housing of the vertically arranged side arm extruder may have a generous cavity at the top, in which even difficult feed material can easily accumulate. The planetary spindles preferably protrude at least partially into the cavity so that the planetary spindles can grip the feed material and pull it into a planetary roller extruder module/planetary roller extruder section arranged vertically underneath. There, the planetary spindles mesh with the external teeth of a central spindle and the internal teeth of the extruder module housing/extruder section housing.

In the cavity provided above, there is a level sensor which provides a signal for replenishing feed material when the level falls below a selected value.

The feed material is heated and melted in the planetary roller extruder module/section and conveyed down to a nozzle. Heating the module housing in the feed area may be provided. After the initial heating, the deformation of the feed material along its way further down leads to further heating and melting. The nozzle is optionally conical and has a tapered discharge end.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
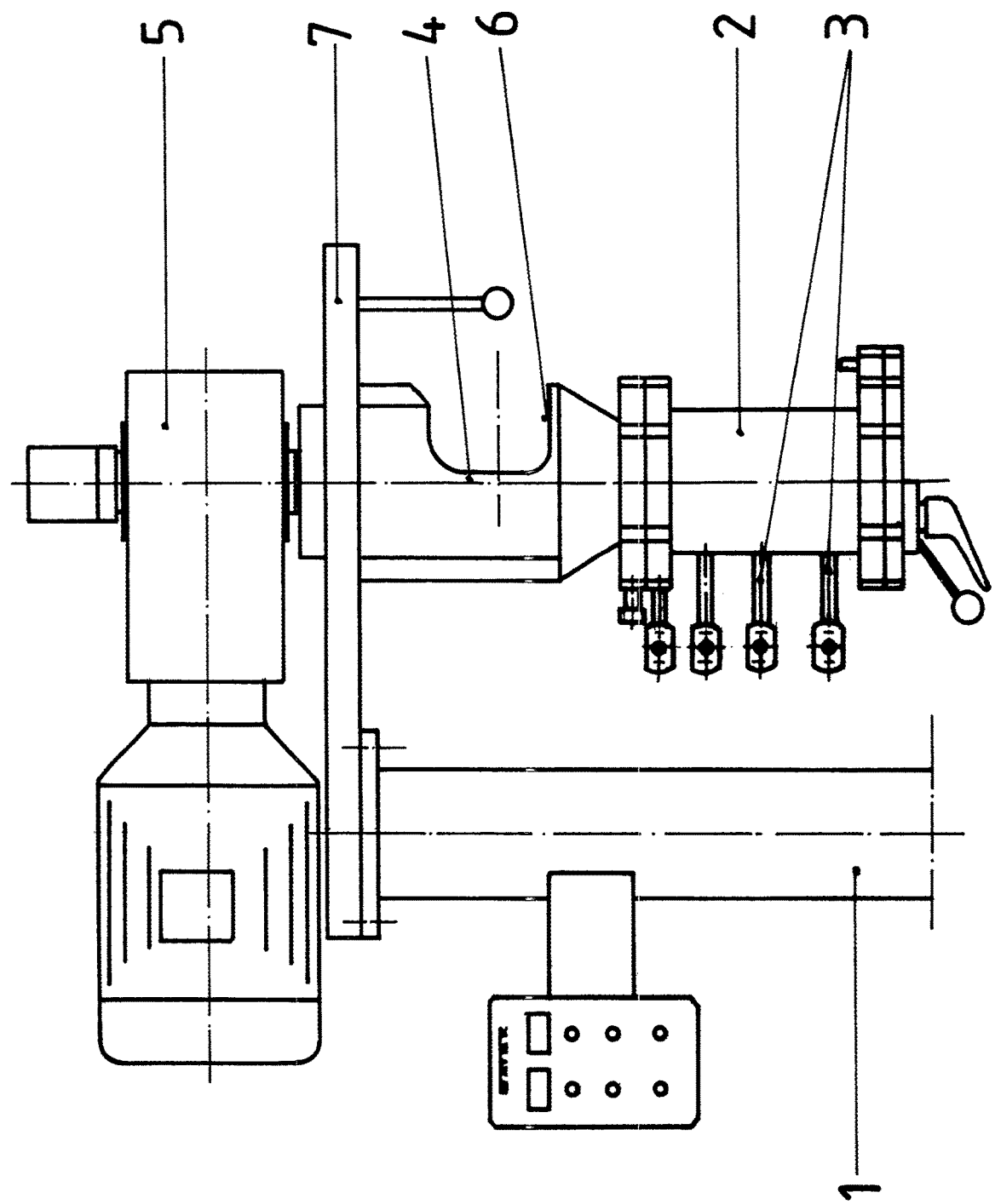
FIG. 1 shows a vertically arranged side arm extruder.

FIG. 1 shows a vertically arranged side arm extruder. A pivot arm 7 is pivotally mounted on a column 1. The pivot arm 7 carries a motor and gear for a planetary roller part 2. The planetary roller part 2 is provided with a feed hopper 4 having a lateral feed opening 6. Inflows and outflows 3 for heating or cooling media are provided.

The planetary roller part 2 has a closable outlet which will be explained below. The planetary roller part 2 includes a central spindle and planetary spindles. The planetary spindles mesh with suitable teeth both with the central spindle and with an internally toothed liner arranged in a housing. In the exemplary embodiment, the reference diameter of the internal toothing is 30 mm. The reference diameter of the internal toothing in millimeters is referred to as a size of the extruder. Here, the size 30. In other embodiments, the size may be larger, for example 50, or smaller.

Figure 5:
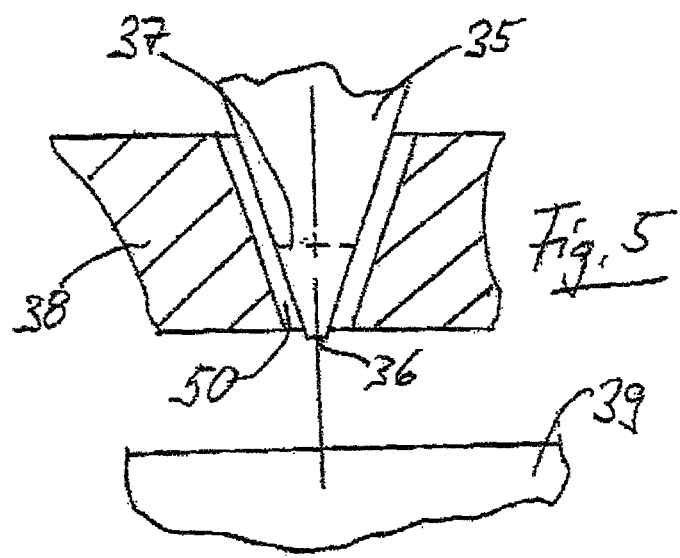
FIG. 5 shows an example nozzle configuration of a side arm extruder.
Figure 6:
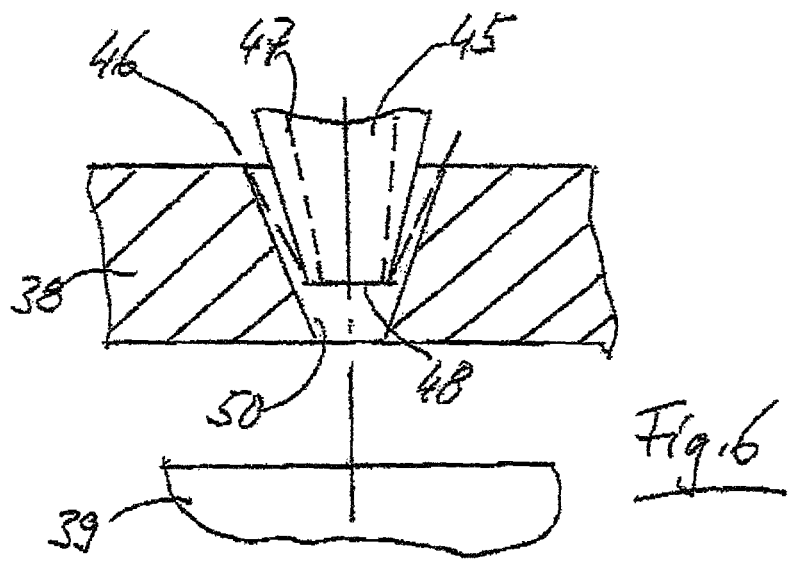
FIG. 6 shows another example nozzle configuration.

The side arm extruder is operatively connected to a main extruder. A small portion of the main extruder is shown in FIGS. 5 and 6. The side arm extruder has the design of a planetary roller extruder. The planetary roller module 2 includes a housing, a central spindle and planetary spindles, which mesh with suitable teeth both with the central spindle and with an internally toothed liner arranged in the housing.

The design number of the planetary roller module is six. Design number refers to the number of planetary spindles that are present in an extruder configured for normal operation between the central spindle and the liner of the housing. In the exemplary embodiment, a planetary roller module known from DE 19434813 operates with three evenly distributed planetary spindles instead of six planetary spindles. As a result, there are significant gaps between two adjacent planetary spindles.

The side arm extruder is used to produce a premix of plastic with various additives. For this purpose, a subset (minor portion) of the plastic to be processed together with the additives is fed through the opening 6 into the hopper 4. The partial amount of plastic in the exemplary embodiment is 10% by weight of the total amount of material processed in the main extruder. The amount of additives is 2% by weight of the total amount of material processed in the main extruder.

The additives are first processed in the side arm extruder while the outlet of the side arm extruder is closed. This includes melting the plastic, dispersing the additives, and homogenizing the melt. During this time the mixture moves back and forth in the planetary roller module 2. The planetary spindles and the central spindle convey the mixture towards the outlet of the side arm extruder. But since the extruder's outlet is closed, the mixture escapes into the spaces between the planetary spindles, the central spindle, and the liner. There, the mixture can flow back against the conveying direction of the planetary spindles.

There is sufficient space between the planetary spindles that the extruder can continue to run when the nozzle is closed or only partly open. Excess melt conveyed towards the nozzle flows back in form of a leakage flow between the planetary spindles. This is, until the planetary spindles grasp the melt that has flowed back and again convey it in the direction of the nozzle. If the nozzle is still not open, the backflow/leakage flow will repeat.

Advantageously, the backflow/leakage flow is used to first achieve a perfect melt mixture when starting the side arm extruder with a closed nozzle before the nozzle is opened. This allows operation without start-up losses.

Another advantage of the backflow/leakage flow is when the leakage flow extends as far as possible to the feed hopper/filling hopper 4 through which the feed material is fed into the side arm extruder. There is still a high friction of the solid particles. This friction is drastically reduced by the backflowing melt. The backflow/leakage flow acts as a lubricant between the solid particles. Also, the mixing improves.

The prepared premix is discharged into the main extruder 39. In a preferred embodiment this is done through a lateral opening of the main extruder immediately downstream of the section of the main extruder, in which the remaining 78 wt. % (major portion) of the feed material mixture (consisting of plastic and fillers) have been fed in. The premixture may be discharged into the main extruder continuously.

The amount of material which leaves the side arm extruder is replenished in the form of plastic and additives through the opening 6 of the hopper 4 in the predetermined ratio. For this purpose, a level sensor is provided in the side arm extruder. An output of the level sensor is used to control the material feed into the hopper 4.

Figure 2:
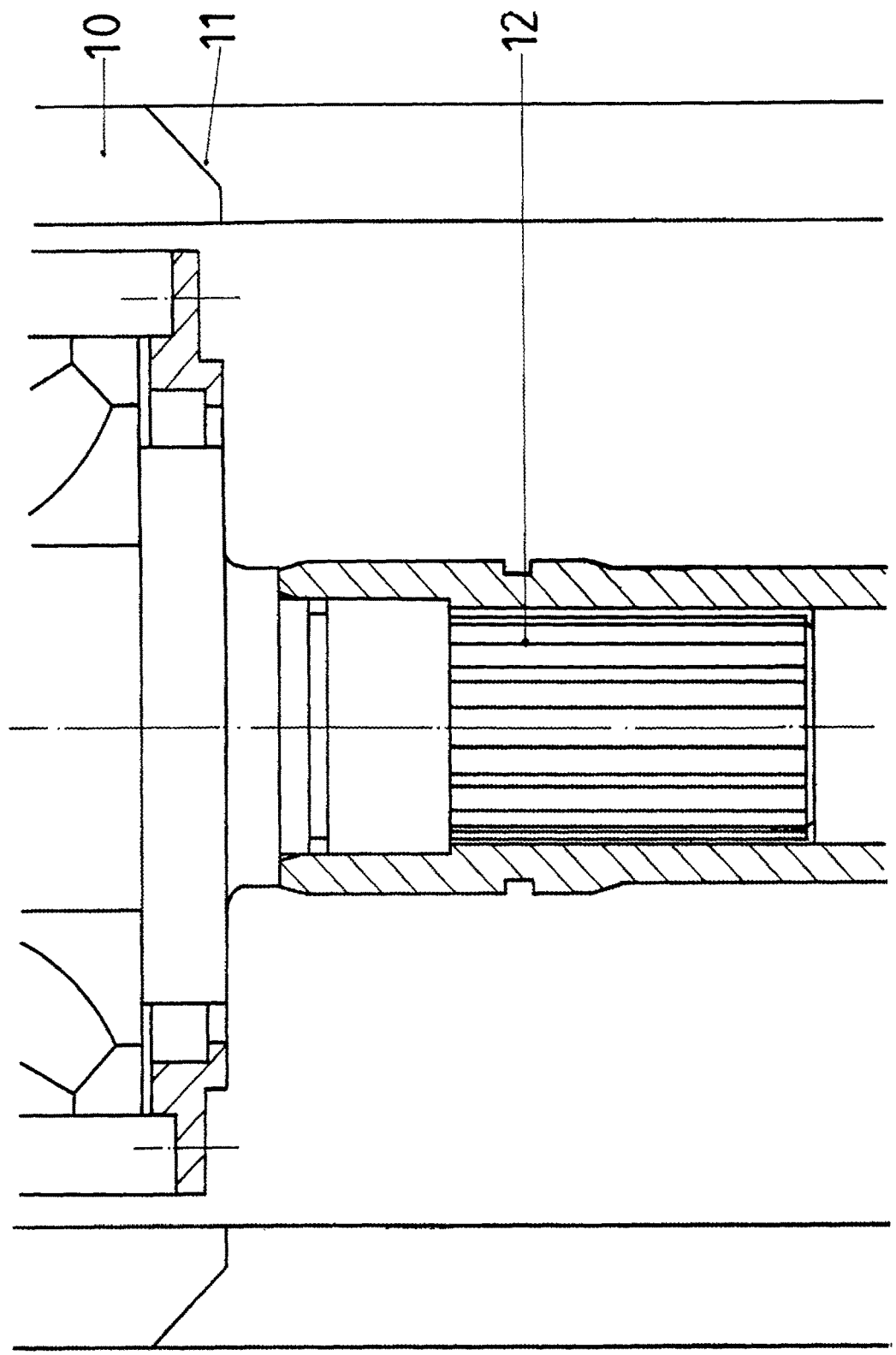
FIG. 2 is a cross sectional view of an upper portion of a feed hopper.
Figure 3:
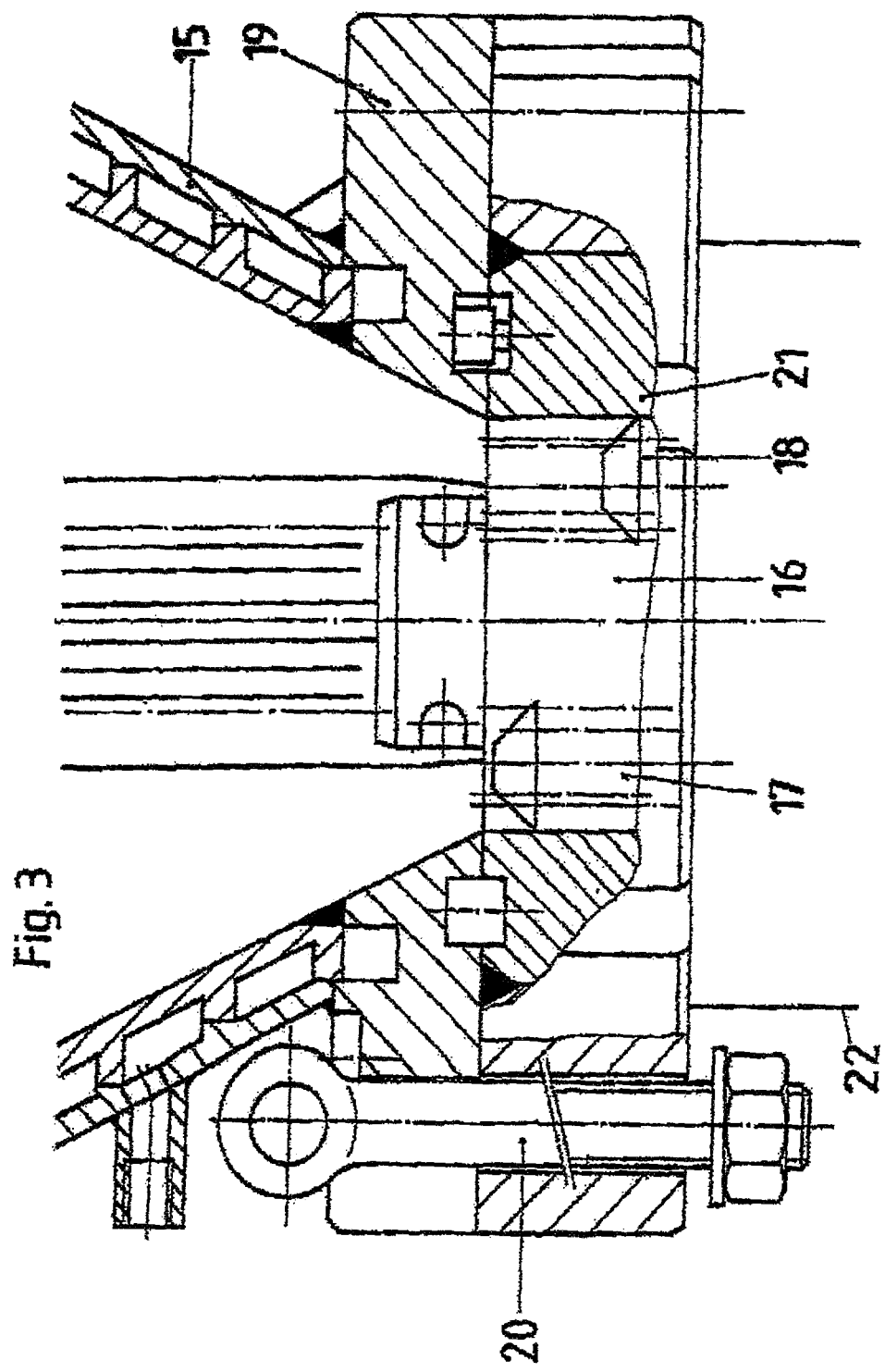
FIG. 3 is a cross sectional view of a lower portion of the feed hopper.
Figure 4:
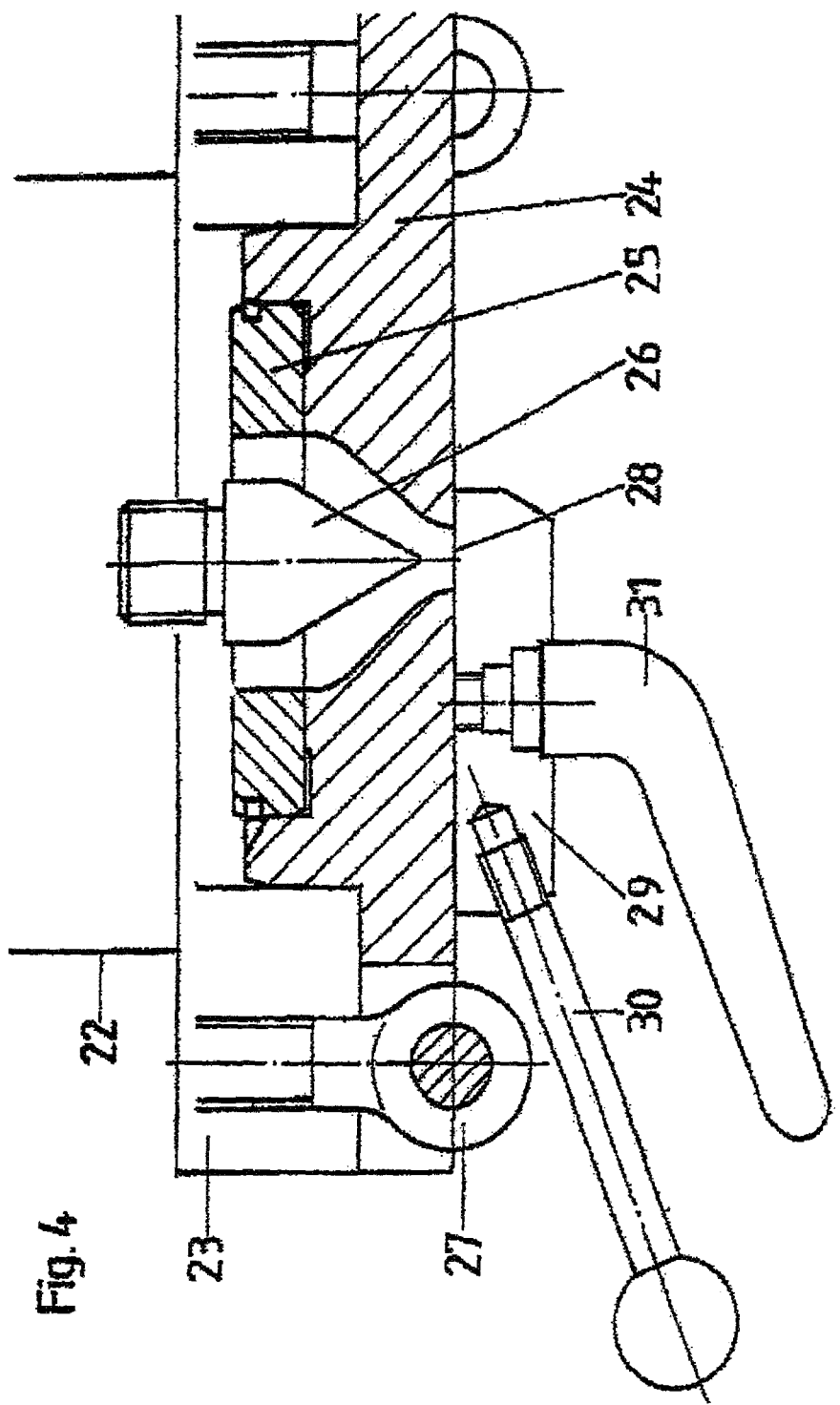
FIG. 4 shows a mechanism with which an outlet of a side arm extruder can be completely or partially closed and reopened.

FIGS. 2 to 4 show additional details of the side arm extruder according to FIG. 1.

FIG. 2 shows the feed hopper with a housing 10 which is fastened to the pivot arm 7 with an upper flange. The pivot arm supports a drive 5. A drive shaft 12 extends from the drive to the central spindle of the planetary roller part 2. The upper contour ii of the opening 6 is shown.

FIG. 3 shows the funnel 15 of the material hopper 4. The central spindle 16 is surrounded by planetary spindles 17, 18. The planetary spindles 17, 18 have different lengths, so that they protrude differently high into the hopper 15. The planetary spindles thereby generate an advantageous feed-in effect with respect to the feed material entering from the hopper into the planetary extruder. During operation, the rotating planetary spindles slide on a stop ring 25.

The housing 22 of the planetary roller part 2 is releasably secured to the bottom of the hopper 4 with swing screws. The swing screws facilitate loosening and fastening by being swung in or can be disengaged by pivoting.

FIG. 4 shows a mechanism with which an outlet of the side arm extruder can be completely or partially closed and reopened. By partial closure or partial opening, the melt stream leaving the side arm extruder, including the blended additives or fillers, can be adapted to the needs of the main extruder.

When the outlet of the side arm extruder is partially or completely closed, the side arm extruder can continue to convey the melt against the outlet. The excess melt can flow back within the side arm extruder between the planetary spindles. A special flow, which is referred to as "circular flow", is formed with the back-flowing melt and with the melt that is conveyed by the planetary spindles towards the outlet. That is, melt within the extruder flows both towards and away from the outlet. This includes a simplification of the flow path.

The side arm extruder has a flange 23 at the lower end of the housing 22 which receives the stop ring 25 for the planetary spindles. The central spindle ends in a tip 26, which determines the outlet opening 28 of the extruder in a screwed-on cover plate 24. The cover plate 24 forms with the discharge opening 28 and the tip 26 a nozzle. The nozzle can be completely or partially closed or completely or partially opened by displacement of the central spindle. That is, the tip 26 moves towards the cover plate 24 or away from the cover plate 24. The movement is effected by a piston, not shown, which sits on the transmission and acts in the axial direction on the central spindle. At the same time a splined coupling is provided between the gear of the transmission, which transmits the drive movement to the central spindle, and the central spindle. A plurality of wedges are circumferentially distributed on the central spindle. These wedges engage in grooves of the gear, so that an axial displacement of the central spindle relative to the gear is possible without the drive connection being lost.

FIG. 5 shows another embodiment of a vertical side arm extruder. The side arm extruder includes a cover plate 38, a conical opening 50 and conical tip 35. The cover plate forms with the opening 50 and the tip 35 a nozzle. Axial adjustment of the tip 35 serves to control an opening gap between the conical opening 50 of the cover plate 38 and the conical tip 35 as required. The gap is reduced as demand for melt from the side arm extruder decreases. As demand for melt from the side arm extruder increases, the gap is increased. The gap can also be completely closed. The effect corresponds to the embodiment of FIG. 4. The side arm extruder can be completely or partially closed and opened. The partial opening and partial closing serve to adapt discharge of melt from the side arm extruder to the needs of the main extruder. The same applies to complete closing.

FIG. 5 schematically shows a part of the main extruder 39. According to FIG. 5, the tip 35 of the central spindle and the outlet opening 50 have the same taper angle. In this case, the end 36 of the tip is so small that the tip 35 protrudes with the end 36 in the closed position beyond to the cover plate 38.

However, if the end 37 of the central spindle tip 35 is much larger, the end 37 of the tip is in the closed position is recessed into the cover plate 38.

FIG. 6 shows a cover plate 38 with an outlet opening 50 and a tip 45 of the central spindle having different taper angles. In a configuration of a conical tip 47 shown in dashed lines, the smaller surface end 48 of the tip projects through the outlet opening in the closed position. Thus, the lower edge of the opening 50 touches the lateral surface of the tip 47. However, if the tip 45 has configuration 46 shown in dashed lines, the upper edge of the opening 50 touches the lateral surface of the conical tip 46.

Figure 7:
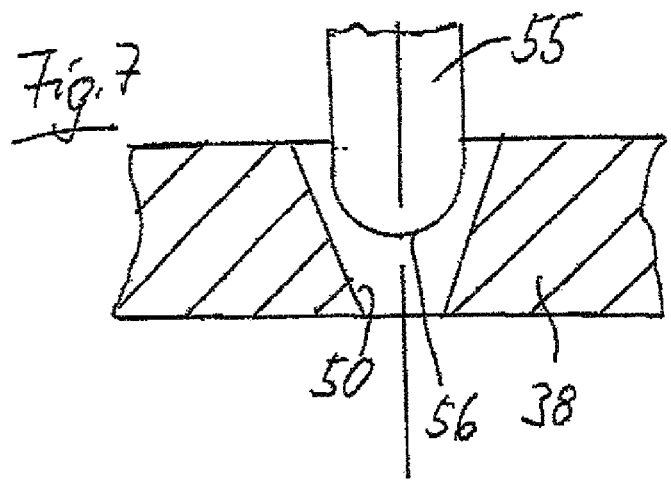
FIG. 7 shows a further example nozzle configuration.
Figure 8:
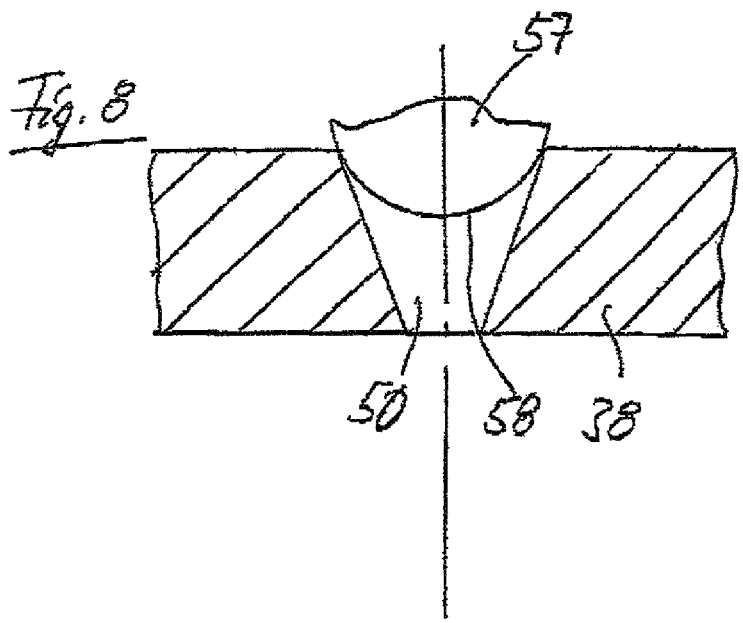
FIG. 8 shows yet another example nozzle configuration.

In the embodiments of FIGS. 7 and 8, a cover plate 38 with its outlet opening 50 is shown in combination with other tips of the central spindle. FIG. 7 shows a tip 55 with a spherical end 56 which, in the closed position, butts against the inner surface of the outlet opening 50. The spherical shape of the tip 55 simplifies the closing movement since a plan-parallel alignment of the cover plate to the housing is no longer required. FIG. 8 shows a tip 57 having a spherical end 58 which rests against the upper edge of the cover plate 38 due to its large diameter.

Figure 9:
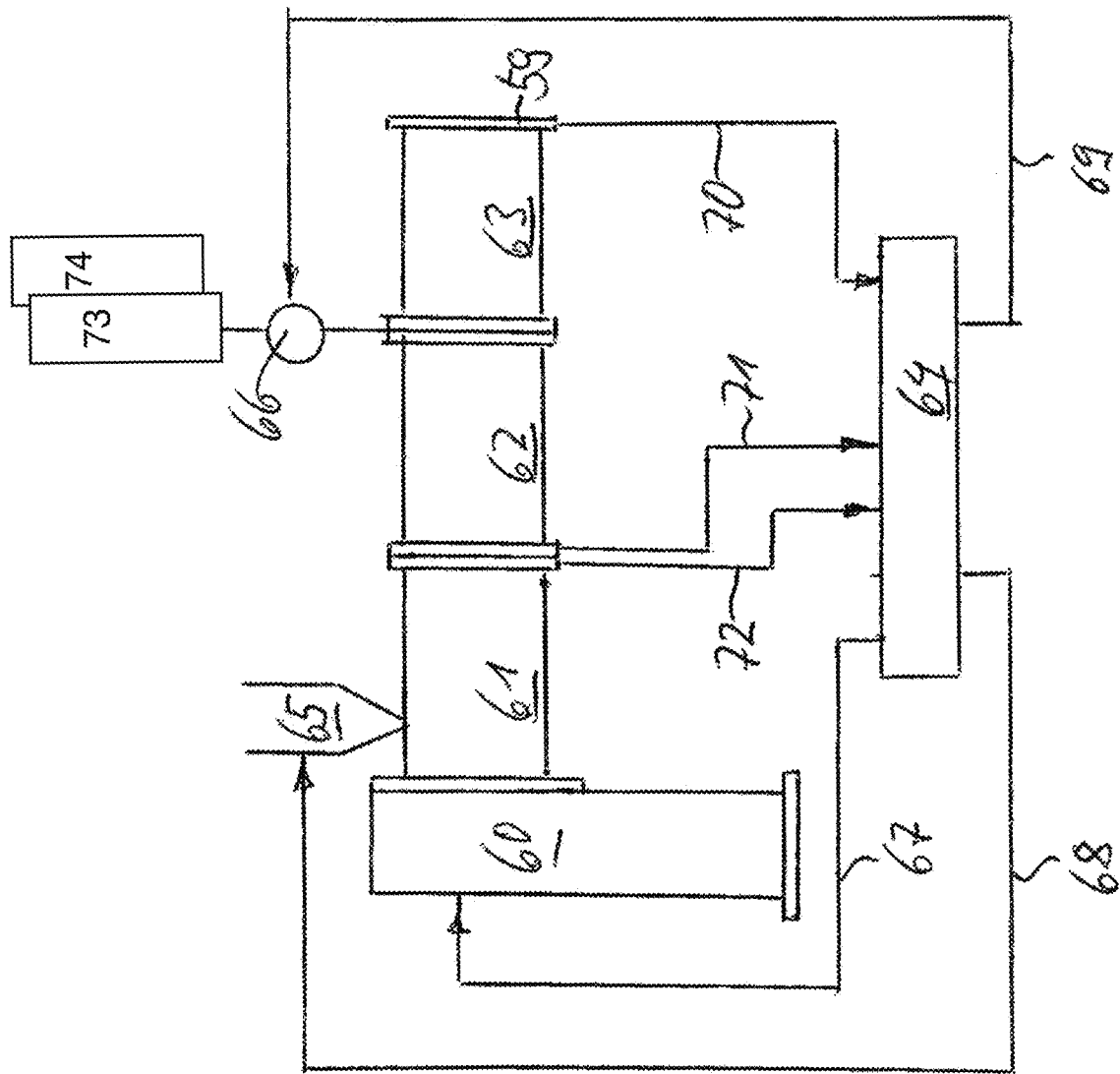
FIG. 9 is a block diagram representation of an extrusion line.

FIG. 9 shows another embodiment for premixing finely ground color particles in molten plastic. The premix is carried out in a side arm extruder 73, 74 as shown in FIGS. 1 to 8. The main extruder is modular in design and comprises a drive 60, several modules 61, 62, 63, a controller 64, a spectrophotometer 59 and a material feed 65. In contrast to the embodiments of FIGS. 4 to 8, however, the side arm extruder is connected via a pump 66 to the main extruder. The pump 66 can control the flow of melt from the side arm extruder 73, 74 with the same result as shown in FIGS. 4 to 8. The side arm extruder may be a single-screw or twin-screw extruder 73 or a planetary roller extruder 74 with reduced conveying effect. The planetary roller extruder 74 may have fewer than a maximum possible number of planetary spindles revolve around the central spindle.

According to FIG. 9, a color prepared in the side arm extruder is injected by the pump 66 via a nozzle ring between the second module 62 and the third module 63 into the feed mixture of the main extruder. The injection point in the exemplary embodiment has been selected such that mixture components which have been inserted into the main extruder through the feeder 61 have already been sufficient mixed. The subsequent processing of the color in the main extruder can essentially be limited to the dispersion of the color in the feed material mixture. In the illustrated embodiment, this takes place in the third module 63 immediately before the outlet. The color of the feed material mixture is tested on exiting the main extruder with a spectrophotometer 59.

With the spectrophotometer 59, a spectral analysis of the colored mixture is created. In conventional spectral analyzes of colors, the colors are illuminated with a light source and the reflected light is decomposed and its wavelength measured at different angles. The measurement can take place immediately after the exit of the extrusion material from the nozzle. In other embodiments, a measurement can also take place during the extrusion process. A measurement is possible at the extruder by removing samples from the extruder. Advantageously, samples can be obtained from extruder areas in which there is sufficient pressure for melt to be pushed out. Then, an opening in the extruder's lateral surface can be used to let melt escape to the outside to obtain sample material for testing. Optionally, the sample amounts can emerge continuously or discontinuously. The color measurement of samples emerging from the extruder reduces the risk of defects in end products, for example in films, because a color correction can still be effected in the extruder. After the color measurement, the melt can be returned to the extruder inlet. For the color measurement therefore no loss of melt need be accepted.

The results of the color measurement are compared with the results of a spectral analysis of a reference color. Preferably, digitized values are compared with each other. In the case of deviation, it is stored in files, which mixing proportions of the color must be changed to what extent, in order to achieve a match with the reference color. The resulting data form the control data for an automatic increase or decrease in the color dosage or automatic increase or decrease of certain color components. This is done in the embodiment by changing the power of the pump 66. The pump 66 is a rotary pump in the embodiment, so that the change of the pump power takes place via a speed change. Increasing the speed increases the flow of color, reducing the speed reduces the flow of color. The pump can also be stopped so that no more color flows.

The controller 64 is formed by a programmable logic controller (PLC). The controller 64 acts on the drive 60, the material feed 65 and the pump 66. At the same time, pressure and temperature of the feed mixture are measured and taken into account in the controller 64. The pump 66 is connected to the controller 64 by a control line 69. The spectrophotometer 59 is connected to the controller 64 by a data line 70. The material feed 65 is connected by a control line 68, the drive 60 by a control line 67. The pressure and temperature sensors are connected to the controller 64 by data lines 71, 72. The sensors for pressure and temperature are arranged in a ring, which are arranged between the first module 61 and second module 62.

When dosing color, the usual additive amount is between 0.5 and 1.5 wt %, based on the total amount of material to be colored. In the exemplary embodiment, this is the entire feed material mixture in the main extruder. The color is premixed in the embodiment with three times the amount of liquid plastic in the side arm extruder and fed to the main extruder.

Planetary roller extruders with a size of less than or equal to 50, even less than or equal to 30, can be sufficient for this purpose. The sizes refer to the reference diameter of the internal teeth in the housing of the planetary roller extruder. That is, the associated planetary roller extruder has an internal toothing of the housing having a reference diameter less than or equal to 50 mm, or even less than/equal to 30 mm.

With the necessary addition of color, a quick color change may be desired. In a further exemplary embodiment, two side arm extruders in planetary-roller extruder design are operated in parallel. In this further embodiment a first side arm extruders can feed into the main extruder while a second side arm extruder circulates its melt. A desired color change is then effected by closing the nozzle of the first side arm extruder and opening the nozzle of the second side arm extruder. In that case, the conditions are reversed to the extent that the first side arm extruder now circulates its melt in a standby state, while the second extruder supplies its previously circulated melt into the main extruder. If subsequently the original color is needed again, the change proceeds accordingly.

The colored melt is a sufficiently liquid to be injected through a nozzle ring into the main extruder. The nozzle ring is part of a ring construction, which also includes the sliding ring (stop ring) on which the rotating planetary spindles slide. This results in a simple assembly of the ring between modules of a modular constructed side arm extruder in planetary roller extruder design. The nozzle ring or the associated ring construction is held between two mutually facing ends of the planetary roller extruder modules, which are clamped together.

The nozzle ring may consist in the embodiment of two rings, one of which has a cross section corresponding to a horizontal "U". The other ring then has a disc shape and can close the open end of the ring with U-shaped cross-section, so that a closed hollow annulus is formed. The melt line of the side arm extruder leads to the hollow annulus. The supplied melt is distributed in the annulus and exits through several outlet nozzles of the nozzle ring into the main extruder. The nozzles are evenly distributed on the end face of the ring, pointing to the outlet end of the main extruder.

Advantageously, the nozzle ring also allows the connection of a second side arm extruder for introducing melt. Depending on the nature of the additives, a similar low viscosity liquid suitable for use in combination with the nozzle ring may be obtained in combination with other additives. Where the viscosity of the melt emerging from the side arm extruder is too high for injection via a nozzle ring, the melt is introduced via a lateral opening of the extruder housing.

Depending on the design of the entry into the main extruder, the melt must penetrate through the orbit of the planetary spindles into the interior of the main extruder, when the main extruder is designed in the feeder section in planetary roller extruder design. Since the side arm extruder is arranged vertically, color and plastic can be fed above the planetary spindle heads through the housing shell.

In a further embodiment, the side arm extruder is connected to the feeder section of the main extruder, such that the melt emerging from the side arm extruder is already mixed in the feeder section with the feed material plastic granules and acts as a lubricant on the granules. This is very conducive to the pulling-in, compaction, deformation and melting of the granules in the extruder. This is especially true for a feeder section in the type of a planetary roller extruder.

In still other embodiments, the side arm is connected directly behind the feeder section/feeding area of the main extruder, so that the mixture introduced via the side arm extruder is advantageously mixed into the main amount of the plastic (dispersed and homogenized).

In yet other embodiments, mixture components that are heat-sensitive or mechanically sensitive or otherwise sensitive to certain loads in the main extruder are fed via the side arm extruder and the side arm extruder is connected to the main extruder where sensitive mixture components are not subjected to damaging loads or such damaging loads are minimized.

This can also lead to the use of multiple side arm extruders, wherein the insensitive mixture components are fed with a first side arm extruder immediately after the feeder section into the main extruder. The sensitive mixture components can be added to the main extruder with a second side arm extruders at a downstream section of the main extruder where disadvantageous loads for these mixture components no longer occur or are minimized.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for mixing extrudable plastic with small amounts of other substances in an extruder, comprising:
   providing a main extruder;
   providing a side arm extruder in fluid communication with the main extruder;
   premixing a minor portion of a plastic feed material with a small amount of one or more other substances in the side arm extruder, the small amount being less than 4 wt % of an entire amount of material processed in the main extruder;
   feeding a major portion of the plastic feed material directly into the main extruder;
   plasticizing the major portion of the plastic feed material in the main extruder;
   discharging a plasticized pre-mixture of the minor portion of the plastic feed material and the small amount of one or more other substances from the side arm extruder into the main extruder; and
   mixing, in the main extruder, the major portion of the plastic feed material and the plasticized pre-mixture from the side arm extruder.

2. The method as in claim 1, wherein the minor portion of the plastic feed material accounts for at least 10 wt % of the plasticized pre-mixture processed in the side arm extruder.

3. The method as in claim 1,
   wherein the major portion of the plastic feed material is subjected to thermal or mechanical stress in sections of the main extruder which would damage the one or more other substances, and
   wherein the pre-mixture is discharged into the main extruder downstream of those sections in which the one or more other substances would be damaged.

4. The method as in claim 1,
   wherein the plastic feed material is solid, and
   wherein the plasticized pre-mixture is discharged from the side arm extruder into the main extruder at a feeder section of the main extruder, thereby reducing friction of the solid plastic feed material in the feeder section of the main extruder.

5. The method as in claim 1, wherein the side arm extruder is provided with a nozzle that can be opened and closed.

6. The method as in claim 1, wherein at least a portion of the plasticized pre-mixture in the side arm flows against a conveying direction of the side arm extruder.

7. The method as in claim 6, wherein the side arm extruder is a single-screw extruder or a twin-screw extruder with a reduced conveying effect.

8. The method as in claim 7, wherein the single-screw extruder or the twin-screw extruder with a reduced conveying effect comprises at least one screw with recesses.

9. The method as in claim 6, wherein the side arm extruder is a planetary roller extruder with a reduced conveying effect.

10. The method as in claim 6, wherein the side arm extruder comprises a closable extruder outlet.

11. The method as in claim 10,
    wherein a nozzle is provided at the closable extruder outlet and
    wherein opening and closing the nozzle, completely or partially, is effected by axial movement of a screw or a central spindle in the side arm extruder.

12. The method as in claim 11, wherein the screw or the central spindle has a tapered tip which projects into the nozzle when the nozzle is closed.

13. The method as in claim 12, wherein the nozzle has a tapered opening, or has a cylindrical opening.

14. The method as in claim 10, wherein
wherein a nozzle is provided at the closable extruder outlet and
wherein opening and closing the nozzle, completely or partially, is effected by a gate valve.

15. The method as in claim 10, wherein a pump is arranged at the extruder outlet.

16. The method as in claim 1, further comprising:
measuring a consumption of melt; and
replenishing the plastic feed material in response to the measured consumption of melt.

17. The method as in claim 16,
wherein measuring a consumption of melt includes measuring a fill-level in the side arm extruder, and
replenishing the plastic feed material in response to the measured consumption of melt includes feeding feed material into the side arm extruder until a predetermined fill-level is reached.

18. The method as in claim 1, wherein the side arm extruder is a planetary roller extruder in a vertical arrangement.

19. The method as in claim 1, wherein the side arm extruder is a planetary roller extruder with a central spindle, the planetary roller extruder
having fewer than a maximum possible number of planetary spindles revolve around the central spindle.

20. The method as in claim 19, wherein the side arm extruder has at least three planetary spindles.

21. The method as in claim 19, further comprising:
removing one or more planetary spindles from the side arm extruder; and
repositioning the remaining planetary spindles circumferentially evenly around the central spindle.

22. The method as in claim 19,
wherein at least one tooth on at least one planetary spindle has been completely or partially removed.

23. The method as in claim 1, wherein the side arm extruder comprises a bypass through which plasticized pre-mixture that has not been discharged into the main extruder can be recycled.

24. The method as in claim 1, wherein a reference diameter of a housing internal toothing of the side arm extruder is 50 mm or less.

25. The method as in claim 1, wherein the small amount of one or more other substances are color particles.

26. The method as in claim 25, wherein the pre-mixture is discharged into the main extruder through a nozzle ring of the main extruder.

27. The method as in claim 25, further comprising:
measuring a color of material in the main extruder and comparing the measured color with a reference color, and
adjusting a quantity of the color particles if a deviation between the measured color and the reference color is detected.

28. The method as in claim 27, further comprising:
converting the measured color into a digital value and comparing the digital value with a digital reference value of the reference color.

29. The method as in claim 27, wherein the color of the material in the main extruder is measured after the material has left the main extruder and/or while the material is being processed in the main extruder.

30. The method as in claim 29, further comprising:
removing a sample quantity of material from the main extruder for the color measurement.

31. The method as in claim 30, further comprising:
returning the sample quantity of material into the main extruder.

* * * * *